US012782310B2

(12) United States Patent
Zhou

(10) Patent No.: US 12,782,310 B2
(45) Date of Patent: Nov. 3, 2026

(54) BATTERY SAFETY TESTING APPARATUS, BATTERY MANAGEMENT CHIP, AND BATTERY MANAGEMENT SYSTEM

(71) Applicant: ZHUHAI MAIJU MICROELECTRONICS CO., LTD., Zhuhai (CN)

(72) Inventor: Hao Zhou, Zhuhai (CN)

(73) Assignee: ZHUHAI MAIJU MICROELECTRONICS CO., LTD., Zhuhai (CN)

( * ) Notice: Subject to any disclaimer, the term of this patent is extended or adjusted under 35 U.S.C. 154(b) by 611 days.

(21) Appl. No.: 18/259,589

(22) PCT Filed: Jan. 11, 2021

(86) PCT No.: PCT/CN2021/071100

§ 371 (c)(1),
(2) Date: Jul. 18, 2024

(87) PCT Pub. No.: WO2022/141664

PCT Pub. Date: Jul. 7, 2022

(65) Prior Publication Data

US 2024/0402115 A1 Dec. 5, 2024

(30) Foreign Application Priority Data

Dec. 29, 2020 (CN) ......................... 202011598018.8
Jan. 2, 2021 (CN) ......................... 202110000271.7
(Continued)

(51) Int. Cl.
*G01N 27/22* (2006.01)
*G01B 7/28* (2006.01)
(Continued)

(52) U.S. Cl.
CPC ............. *G01N 27/223* (2013.01); *G01B 7/28* (2013.01); *G01N 27/226* (2013.01);
(Continued)

(58) Field of Classification Search
CPC ...... G01N 27/223; G01N 27/226; G01B 7/28; H01M 10/4264; H01M 10/4285; H01M 10/482; H01M 2010/4271
See application file for complete search history.

(56) References Cited

U.S. PATENT DOCUMENTS

2016/0064780 A1* 3/2016 Jarvis ................ H01M 10/4257 429/61
2016/0116548 A1* 4/2016 Ghantous ............ H01M 10/425 702/63
2021/0223021 A1* 7/2021 Bytheway ........... H01M 10/425

FOREIGN PATENT DOCUMENTS

CN 105548289 A 5/2016
CN 105548889 A 5/2016
(Continued)

*Primary Examiner* — Paresh Patel
(74) *Attorney, Agent, or Firm* — Bayramoglu Law Offices LLC

(57) ABSTRACT

A battery safety testing apparatus includes a capacitive sensing apparatus and a signal processing apparatus, where the signal processing apparatus is connected to the capacitive sensing apparatus to obtain a changed inductive capacitance from the capacitive sensing apparatus. The capacitive sensing apparatus includes one or more inductive capacitance portions, the capacitive sensing apparatus is disposed on or close to a surface of the battery, and when the shape change occurs and/or the water content changes, an inductive capacitance measured by the inductive capacitance portion changes. The signal processing apparatus is further configured to measure, based on the inductive capacitance, the shape change of the battery and/or the water content of the surroundings of the battery.

12 Claims, 8 Drawing Sheets

(30) Foreign Application Priority Data

Jan. 3, 2021 (CN) ......................... 202110000360.1
Jan. 3, 2021 (CN) ......................... 202110000371.X

(51) Int. Cl.
*H01M 10/42* (2006.01)
*H01M 10/48* (2006.01)

(52) U.S. Cl.
CPC ... *H01M 10/4264* (2013.01); *H01M 10/4285* (2013.01); *H01M 10/482* (2013.01); *H01M 2010/4271* (2013.01)

(56) References Cited

FOREIGN PATENT DOCUMENTS

| | | | |
|---|---|---|---|
| CN | 109655921 | A | 4/2019 |
| CN | 110352532 | A | 10/2019 |
| CN | 110838748 | A | 2/2020 |
| JP | 2015094726 | A | 5/2015 |

* cited by examiner

BATTERY SAFETY TESTING APPARATUS, BATTERY MANAGEMENT CHIP, AND BATTERY MANAGEMENT SYSTEM

CROSS REFERENCE TO THE RELATED APPLICATIONS

This application is the national phase entry of International Application No. PCT/CN2021/071100, filed on Jan. 11, 2021, which is based upon and claims priority to Chinese Patent Application No. 202011598018.8, filed on Dec. 29, 2020, Chinese Patent Application No. 202110000271.7, filed on Jan. 2, 2021, Chinese Patent Application No. 202110000371.X, filed on Jan. 3, 2021, and Chinese Patent Application No. 202110000360.1, filed on Jan. 3, 2021, the entire contents of which are incorporated herein by reference.

TECHNICAL FIELD

The present disclosure relates to a battery safety testing apparatus, a battery management chip, and a battery management system.

BACKGROUND

Lithium batteries are currently widely used in many aspects of industry and life, but there are some problems in the use of lithium batteries. For example, due to different application environments, a battery may form water vapor in a lithium battery package, and an excess of water vapor is likely to damage to the lithium battery, such as a short circuit of the lithium battery. In addition, the lithium battery is deformed when subjected to external force, and a bulge is generated after the battery is aged. The above problems occurring in the lithium battery are often accompanied by an internal short circuit, fire, or explosion. Therefore, safety testing of the lithium battery is necessary.

SUMMARY

To resolve one of the foregoing technical problems, the present disclosure provides a battery safety testing apparatus, a battery management chip, and a battery management system.

According to one aspect of the present disclosure, a battery safety testing apparatus is provided, where the battery safety testing apparatus is configured to measure a shape change of a battery and/or water content of an environment in which the battery is located, and the battery safety testing apparatus includes: a capacitive sensing apparatus, where the capacitive sensing apparatus includes one or more inductive capacitance portions, the capacitive sensing apparatus is disposed on or close to a surface of the battery, and when the shape change occurs and/or the water content changes, an inductive capacitance measured by the inductive capacitance portion changes; and a signal processing apparatus, where the signal processing apparatus is connected to the capacitive sensing apparatus and configured to receive the inductive capacitance measured by the inductive capacitance portion, to measure, based on the inductive capacitance, the shape change of the battery and/or the water content of the environment in which the battery is located.

According to at least one implementation, the capacitive sensing apparatus is a capacitor plate, and the capacitor plate forms the inductive capacitance portion.

According to at least one implementation, the capacitive sensing apparatus is a conductor or a semiconductor used for packaging the battery and/or a conductor, a semiconductor, and/or a conductive material disposed on or close to an inner surface or an outer surface of the battery, and a surface of the conductor, the semiconductor, and/or the conductive material is coated with an insulating material.

According to at least one implementation, the capacitive sensing apparatus includes a first capacitive sensing apparatus and a second capacitive sensing apparatus, the battery includes at least two battery cells, adjacent two of the at least two battery cells are arranged at an interval of a predetermined space, the first capacitive sensing apparatus is disposed in one of the adjacent two of the at least two battery cells, and the second capacitive sensing apparatus is disposed in the other of the adjacent two of the at least two battery cells.

According to at least one implementation, the capacitive sensing apparatus includes a first capacitive sensing apparatus and a second capacitive sensing apparatus, the first capacitive sensing apparatus is disposed on or close to the surface of the battery, and the second capacitive sensing apparatus is disposed close to the first capacitive sensing apparatus.

According to at least one implementation, the first capacitive sensing apparatus includes one or more first inductive capacitance portions, the second capacitive sensing apparatus includes one or more second inductive capacitance portions, and the change of the inductive capacitance caused by the shape change and/or the change of the water content is detected by using the first inductive capacitance portion and/or the second inductive capacitance portion.

According to at least one implementation, the first capacitive sensing apparatus is a first capacitor plate, and the second capacitive sensing apparatus is a second capacitor plate.

According to at least one implementation, the first capacitive sensing apparatus includes at least two first inductive capacitance portions, the second capacitive sensing apparatus includes at least two second inductive capacitance portions, and the at least two first inductive capacitance portions are disposed in a one-to-one correspondence with the at least two second inductive capacitance portions.

According to at least one implementation, a shape of the first inductive capacitance portion and/or the second inductive capacitance portion is selected from a circle, an ellipse, a triangle, and a polygon, the at least two first inductive capacitance portions are located at different locations, and the at least two second inductive capacitance portions are located at different locations.

According to at least one implementation, the first capacitive sensing apparatus includes at least one first inductive capacitance portion, the second capacitive sensing apparatus includes at least one second inductive capacitance portion, and a quantity of first inductive capacitance portions is different from a quantity of second inductive capacitance portions, so that at least two first inductive capacitance portions correspond to one second inductive capacitance portion or at least two second inductive capacitance portions correspond to one first inductive capacitance portion.

According to at least one implementation, the first inductive capacitance portion and the second inductive capacitance portion are strip-shaped, the first inductive capacitance portion extends in a first direction, the second inductive capacitance portion extends in a second direction, and the first direction and the second direction are at a predetermined angle.

According to at least one implementation, there are at least two first inductive capacitance portions and at least two second inductive capacitance portions, and one first inductive capacitance portion and the at least two second inductive capacitance portions respectively form an inductive capacitance.

According to at least one implementation, the first capacitive sensing apparatus includes at least two first inductive capacitance portions, the second capacitive sensing apparatus includes at least two second inductive capacitance portions, and when a change rate or a change value of each inductive capacitance is inconsistent, it is considered that a change of the inductive capacitance is caused by the shape change; or when a change rate or a change value of each inductive capacitance is consistent, it is considered that a change of the inductive capacitance is caused by the change of the water content.

According to at least one implementation, the shape change includes a deformation location, a deformation degree, a deformation range, and/or a deformation type, and the shape change is obtained based on a change rate or a change value of an inductive capacitance measured by each capacitive sensing apparatus.

According to at least one implementation, the capacitive sensing apparatus further includes an intermediate capacitive sensing apparatus, the intermediate capacitive sensing apparatus is disposed between the first capacitive sensing apparatus and the second capacitive sensing apparatus, and the shape change of the battery and/or the water content are/is measured based on an inductive capacitance generated by the intermediate capacitive sensing apparatus and the first capacitive sensing apparatus and/or an inductive capacitance generated by the intermediate capacitive sensing apparatus and the second capacitive sensing apparatus.

According to at least one implementation, the first capacitive sensing apparatus is a first capacitor plate, the second capacitive sensing apparatus is a second capacitor plate, the intermediate capacitive sensing apparatus is a conductor, a semiconductor, or a conductive material, and a surface of the conductor, the semiconductor, and/or the conductive material is coated with an insulating material.

According to at least one implementation, the first capacitive sensing apparatus includes at least two first inductive capacitance portions, the second capacitive sensing apparatus includes at least two second inductive capacitance portions, the intermediate capacitive sensing apparatus includes at least two intermediate inductive capacitance portions, the at least two first inductive capacitance portions are disposed in a one-to-one correspondence with the at least two intermediate inductive capacitance portions, and the at least two second inductive capacitance portions are disposed in a one-to-one correspondence with the at least two intermediate inductive capacitance portions.

According to at least one implementation, a shape of the first inductive capacitance portion, the second inductive capacitance portion, and/or the intermediate inductive capacitance portion is selected from a circle, an ellipse, a triangle, and a polygon, the at least two first inductive capacitance portions are located at different locations, the at least two second inductive capacitance portions are located at different locations, and the at least two intermediate inductive capacitance portions are located at different locations.

According to at least one implementation, the first capacitive sensing apparatus includes at least one first inductive capacitance portion, the intermediate capacitive sensing apparatus includes at least one intermediate inductive capacitance portion, and a quantity of first inductive capacitance portions is different from a quantity of intermediate inductive capacitance portions, so that at least two first inductive capacitance portions correspond to one intermediate inductive capacitance portion or at least two intermediate inductive capacitance portions correspond to one first inductive capacitance portion.

According to at least one implementation, the second capacitive sensing apparatus includes at least one second inductive capacitance portion, the intermediate capacitive sensing apparatus includes at least one intermediate inductive capacitance portion, and a quantity of second inductive capacitance portions is different from a quantity of intermediate inductive capacitance portions, so that at least two second inductive capacitance portions correspond to one intermediate inductive capacitance portion or at least two intermediate inductive capacitance portions correspond to one second inductive capacitance portion.

According to at least one implementation, the first inductive capacitance portion and the intermediate inductive capacitance portion are strip-shaped, the first inductive capacitance portion extends in a first direction, the intermediate inductive capacitance portion extends in a second direction, and the first direction and the second direction are at a predetermined angle.

According to at least one implementation, the second inductive capacitance portion and the intermediate inductive capacitance portion are strip-shaped, the second inductive capacitance portion extends in a first direction, the intermediate inductive capacitance portion extends in a second direction, and the first direction and the second direction are at a predetermined angle.

According to at least one implementation, a first intermediate inductive capacitance portion corresponding to the first capacitive sensing apparatus and a second intermediate inductive capacitance portion corresponding to the second capacitive sensing apparatus are disposed in the intermediate capacitive sensing apparatus, and an insulating material is disposed between the first intermediate inductive capacitance portion and the second intermediate inductive capacitance portion.

According to at least one implementation, the capacitive sensing apparatus includes a capacitive disposing portion and at least two inductive capacitance portions, the at least two inductive capacitance portions are disposed in the capacitive disposing portion, and the shape change and/or the water content are/is measured based on an inductive capacitance formed between adjacent inductive capacitance portions in the at least two inductive capacitance portions.

According to at least one implementation, the shape change and/or the water content are/is measured by measuring an inductive capacitance generated by the one or more inductive capacitance portions relative to a reference ground.

According to at least one implementation, the battery is accommodated in a battery container, the capacitive sensing apparatus is disposed on the battery container or inside or outside the battery container.

According to at least one implementation, the capacitive sensing apparatus includes at least two inductive capacitance portions, the at least two inductive capacitance portions are disposed at an interval of a predetermined distance, and the signal processing apparatus measures the shape change and/or the water content by detecting an inductive capacitance between each inductive capacitance portion and the reference ground.

According to at least one implementation, the signal processing apparatus further measures the shape change and/or the water content by detecting an inductive capacitance between each of the at least two inductive capacitance portions and an adjacent inductive capacitance portion.

According to at least one implementation, the at least two inductive capacitance portions are strip-shaped and disposed in a first direction.

According to at least one implementation, shapes of the at least two inductive capacitance portions are selected from a circle, an ellipse, a triangle, and a polygon, and the at least two inductive capacitance portions are located at different locations.

According to at least one implementation, there are at least two inductive capacitance portions, and when a change rate or a change value of an inductive capacitance measured by each inductive capacitance portion is inconsistent, it is considered that a change of the inductive capacitance is caused by the shape change, or when a change rate or a change value of an inductive capacitance measured by each inductive capacitance portion is consistent, it is considered that a change of the inductive capacitance is caused by the change of the water content.

According to at least one implementation, the shape change includes a deformation location, a deformation degree, a deformation range, and/or a deformation type, and the shape change is obtained based on the change rate or the change value of the inductive capacitance measured by each inductive capacitance portion.

According to another aspect of the present disclosure, a battery management chip is provided, where the battery management chip is integrated with the foregoing signal processing apparatus.

According to at least one implementation, the reference ground is a ground of the battery management chip.

According to at least one implementation, the signal processing apparatus includes: a sampling unit, configured to collect an inductive capacitance generated by the capacitive sensing apparatus; an analog-to-digital conversion unit, configured to convert the collected inductive capacitance into a digital signal; a filtering unit, configured to perform filtering processing on the digital signal to obtain a filtered signal; a calculating unit, configured to calculate the filtered signal to obtain a change rate or a change value of the inductive capacitance; and a determining unit, configured to determine a fault of the battery based on the change rate or the change value of the inductive capacitance.

According to at least one implementation, the signal processing apparatus further includes a multiplexing unit, so that the multiplexing unit selects and measures an inductive capacitance of each inductive capacitance portion, and provides the inductive capacitance for the sampling unit.

According to at least one implementation, the apparatus further includes an applying unit, where the applying unit is configured to provide an excitation signal for the capacitive sensing apparatus.

According to yet another aspect of the present disclosure, a battery management system is provided, including the foregoing battery safety testing apparatus and configured to measure a shape change and/or water content by using the battery safety testing apparatus.

BRIEF DESCRIPTION OF THE DRAWINGS

The accompanying drawings illustrate exemplary implementations of the present disclosure, and are used to explain the principles of the present disclosure together with the descriptions, including the accompanying drawings to provide a further understanding of the present disclosure, and the accompanying drawings are included in this specification and constitute part of this specification.

DETAILED DESCRIPTION OF THE EMBODIMENTS

Figure 1:
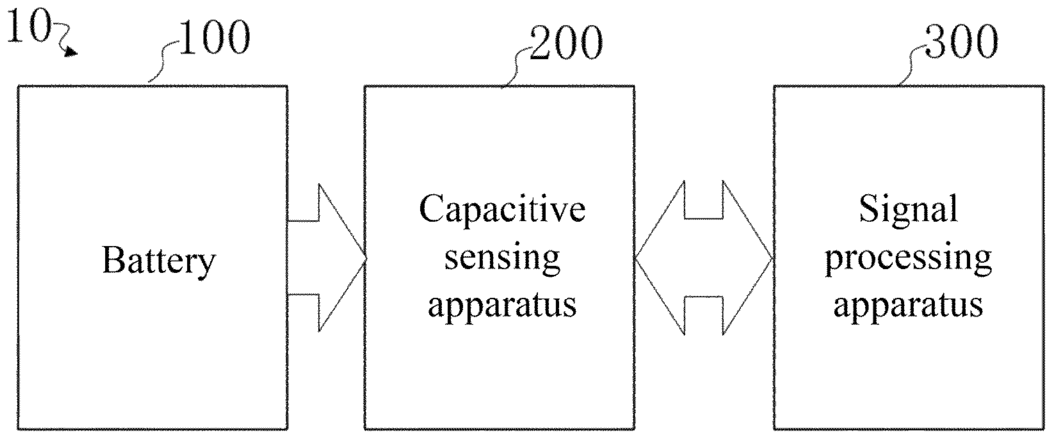
FIG. 1 is a schematic diagram of a battery safety testing apparatus according to an implementation of the present disclosure.

The present disclosure is described in further detail below with reference to the accompanying drawing and implementations. It can be understood that the specific implementations described herein are merely intended to explain the related content, rather than to limit the present disclosure. It should also be noted that, for convenience of description, only the parts related to the present disclosure are shown in the accompany drawings.

It should be noted that the implementations of the present disclosure or the features in the implementations may be combined with each other in a non-conflicting manner. The technical solutions of the present disclosure are described in detail below with reference to the accompanying drawing and implementations.

Unless otherwise stated, the exemplary implementations/embodiments shown are understood as providing exemplary features of various details of some manners for implementing technical concepts of the present disclosure in practice. Therefore, unless otherwise stated, without departing from the technical concepts of the present disclosure, features of various implementations/embodiments may be combined, separated, interchanged, and/or rearranged.

In the accompanying drawings, a crosshatch and/or shadow are/is usually used to make a boundary between adjacent components clear. Therefore, unless otherwise specified, the presence or absence of the crosshatch or shadow does not convey or represent any preference or requirement for specific materials, material properties, sizes, and proportions of components, a commonality of shown components, and/or any other characteristics, attributes, properties, and the like of the components. In addition, in the accompanying drawings, for clarity and/or descriptive purposes, the size and the relative size of the component can be exaggerated. When the exemplary embodiment can be implemented differently, a specific process sequence can be executed in an order different from the described order. For example, two consecutively described processes may be executed simultaneously or in a reverse order of the described order. In addition, the same reference numerals in the accompanying drawings represent the same parts.

When a component is described as being "on" or "above" another component, "being connected to", or "being combined to" another component, the component may be directly on the another component, directly connected to or combined to the another component, or connected to the another component through an intermediate component. However, when a component is described as "being directly on", "being directly connected to", or "being directly combined to" another component, there is no intermediate component. For this purpose, the term "connection" may refer to a physical connection, an electrical connection, or the like, with or without an intermediate component.

For descriptive purposes, the present disclosure can use spatially relative terms, such as "as shown in the accompanying drawings.", "below the lower side of", "under", "lower", "on the upper side of", "upper", "above", "higher", and "side (such as in a "sidewall")" to describe a relationship (relationships) between one component and another component (other components) as shown in the accompanying drawings. In addition to the orientations shown in the accompanying drawings, the spatially relative terms are intended to include different orientations of a device in use, operation, and/or manufacturing. For example, if the device in the accompanying drawing is turned upside down, a component described as being "below the lower side of" or "under" another component or feature is then located "above" the another component or feature. Therefore, the exemplary term "below the lower side of" may include orientations "above" and "below". In addition, the device may be alternatively located (for example, rotated by 90 degrees or in another orientation), thus accordingly explaining spatially relative descriptors used herein.

The terms used herein are merely intended to describe specific embodiments, rather than to limit the present disclosure. As used herein, the singular forms "a", "an" and "the" are intended to include the plural forms, unless the context clearly indicates otherwise. In addition, the terms "including", "including", and/or "containing" and variants thereof, when used in this specification, specify the presence of stated features, entireties, steps, operations, components, elements, and/or combinations thereof, but do not preclude the presence or addition of one or more other entireties, steps, operations, components, elements and/or combinations thereof. It should also be noted that the terms "basically", "approximately", and other similar terms used herein are used as approximate terms rather than degree terms, so that they are used to explain inherent deviations of measured values, calculated values, and/or provided values that are recognized by those of ordinary skill in the art.

According to an implementation of the present disclosure, a battery safety testing apparatus is provided. The battery safety testing apparatus may measure water content of an environment in which a battery is located, or may measure a deformation of the battery.

FIG. 1 is a schematic diagram of a battery safety testing apparatus according to an embodiment of the present disclosure.

Battery safety testing apparatus 10 is configured to measure a shape change of battery 100 and/or water content of an environment in which the battery 100 is located. As shown in FIG. 1, the battery safety testing apparatus 10 may include capacitive sensing apparatus 200 and signal processing apparatus 300.

The battery 100 may be a single battery, or may be a plurality of batteries accommodated in a battery pack.

The capacitive sensing apparatus 200 may be disposed on or close to a surface of the battery 100, and may be disposed on or close to an inner surface or an outer surface of the battery 100 or at a predetermined distance from the outer surface of the battery 100. When a shape of the battery 100 changes or the water content changes, an inductive capacitance measured by the capacitive sensing apparatus 200 changes. The capacitive sensing apparatus 200 may include one or more inductive capacitance portions, and disposing manners of the inductive capacitance portions are described with reference to specific embodiments.

The signal processing apparatus may be electrically connected to the capacitive sensing apparatus 200, and may receive the inductive capacitance from the capacitive sensing apparatus 200, so that the shape change of the battery 100 or the water content can be measured based on the received inductive capacitance.

The capacitive sensing apparatus 200 may be a capacitor plate, and the inductive capacitance portion is formed by using the capacitor plate. The capacitive sensing apparatus 200 is a conductor or a semiconductor used for packaging the battery and/or a conductor, a semiconductor, and/or a conductive material disposed on or close to an inner surface or an outer surface of the battery 100, and a surface of the conductor, the semiconductor, and/or the conductive material is coated with an insulating material. The insulating material may be used to prevent a short circuit or the like.

Figure 2:
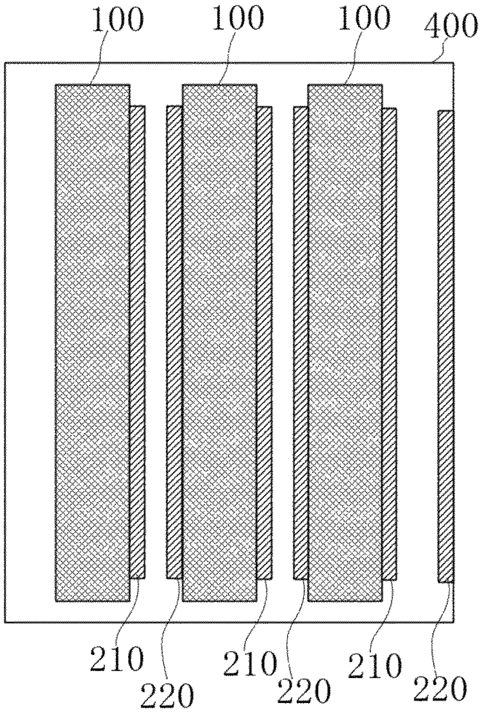
FIG. 2 is a schematic diagram of a battery safety testing apparatus according to an implementation of the present disclosure.

According to an embodiment of the present disclosure, as shown in FIG. 2, the capacitive sensing apparatus 200 may include first capacitive sensing apparatus 210 and second capacitive sensing apparatus 220, the battery 100 may include at least two battery cells, adjacent two of the at least two battery cells are arranged at an interval of a predetermined space, the first capacitive sensing apparatus 210 is disposed in one of the adjacent two of the at least two battery cells, and the second capacitive sensing apparatus 220 is disposed in the other of the adjacent two of the at least two battery cells.

In addition, the first capacitive sensing apparatus 210 of the capacitive sensing apparatus 200 may be disposed on or close to the surface of the battery 100, and the second capacitive sensing apparatus 220 may be disposed close to the first capacitive sensing apparatus 210. For example, as shown in FIG. 2, the first capacitive sensing apparatus 210 may be disposed on or close to the surface of the battery 100, and the second capacitive sensing apparatus 220 may be disposed on housing 400 of a battery container.

Figure 3:
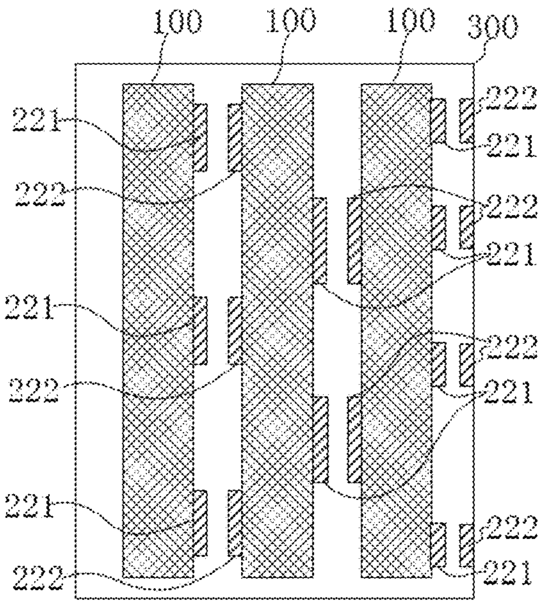
FIG. 3 is a schematic diagram of a battery safety testing apparatus according to an implementation of the present disclosure.

As shown in FIG. 3, the first capacitive sensing apparatus 210 may include one or more first inductive capacitance portions 211, the second capacitive sensing apparatus 220 includes one or more second inductive capacitance portions 221, and the change of the inductive capacitance caused by the shape change and/or the change of the water content is detected by using the first inductive capacitance portion 211 and/or the second inductive capacitance portion 221. A quantity of first inductive capacitance portions 211 and a quantity of second inductive capacitance portions 221 are not limited.

In this implementation, one first inductive capacitance portion 211 and one second inductive capacitance portion 221 may form one capacitive sensing unit, and one first inductive capacitance portion 211 and a plurality of second inductive capacitance portions 221 may also form a plurality of capacitive sensing units.

In addition, the first capacitive sensing apparatus 210 is a first capacitor plate, and the second capacitive sensing apparatus 220 is a second capacitor plate. For example, there is only one first capacitor plate and one second capacitor plate, to obtain a change of an inductive capacitance between the two capacitor plates.

In addition, although capacitive sensing apparatuses are disposed on surfaces of two batteries in the accompanying drawings, a corresponding first capacitive sensing apparatus and a corresponding second capacitive sensing apparatus may be separately disposed in a space between adjacent battery cells.

Figure 4:
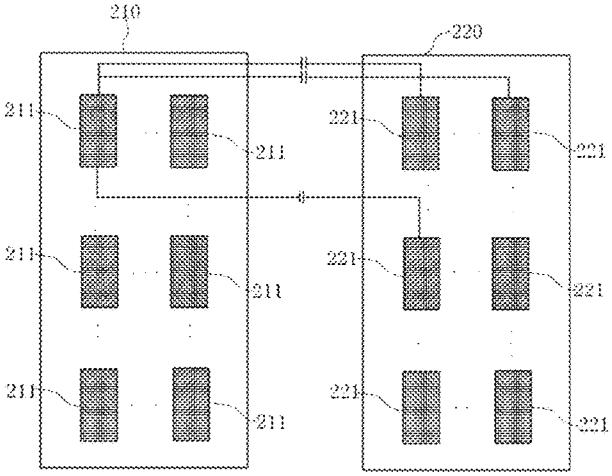
FIG. 4 is a schematic diagram of a battery safety testing apparatus according to an implementation of the present disclosure.

As shown in FIG. 4, the first capacitive sensing apparatus 210 includes at least two first inductive capacitance portions 211, the second capacitive sensing apparatus 220 includes at least two second inductive capacitance portions 221, and the at least two first inductive capacitance portions 211 are disposed in a one-to-one correspondence with the at least two second inductive capacitance portions 222. As shown in FIG. 4, the first inductive capacitance portion 211 and the second inductive capacitance portion 222 that are in a one-to-one correspondence generate an inductive capacitance, the first inductive capacitance portion 211 and the adjacent second inductive capacitance portion 222 also generate an inductive capacitance, and adjacent first inductive capacitance portions 211 also generate an inductive capacitance.

A shape of the first inductive capacitance portion 211 and/or the second inductive capacitance portion 221 may be selected from a circle, an ellipse, a triangle, and a polygon, the at least two first inductive capacitance portions may be located at different locations, and the at least two second inductive capacitance portions may be located at different locations. For example, the shape of the first inductive capacitance portion 211 and/or the second inductive capacitance portion 221 may be a square, a rectangular, a circle, a trapezoid, a diamond, a triangle, T-shaped, fork-shaped, a polygon, or the like, and this is not limited in the present disclosure. In addition, the corresponding first inductive capacitance portion 211 and the corresponding second inductive capacitance portion 221 may have different shapes. In another implementation/embodiment, the shape of the first inductive capacitance portion 211 and/or the second inductive capacitance portion 221 may be the foregoing shape or any other shape.

The first capacitive sensing apparatus 210 may include at least one first inductive capacitance portion, the second capacitive sensing apparatus 220 may include at least one second inductive capacitance portion, and a quantity of first inductive capacitance portions 211 is different from a quantity of second inductive capacitance portions 221, so that at least two first inductive capacitance portions 211 correspond to one second inductive capacitance portion 221 or at least two second inductive capacitance portions 221 correspond to one first inductive capacitance portion 212.

Figure 5:
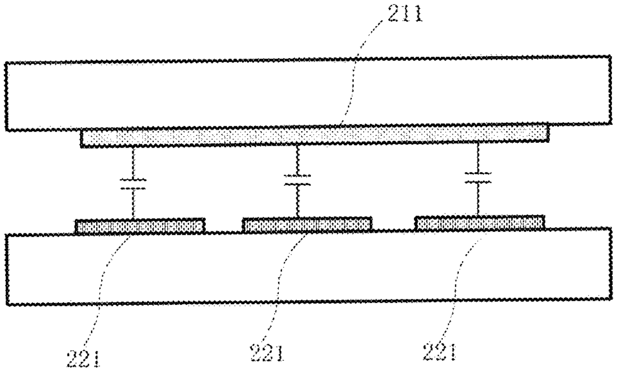
FIG. 5 is a schematic diagram of a battery safety testing apparatus according to an implementation of the present disclosure.

For example, as shown in FIG. 5, one first inductive capacitance portion 211 may correspond to three second inductive capacitance portions 221.

The first inductive capacitance portion 211 and the second inductive capacitance portion 221 may be strip-shaped, the first inductive capacitance portion 211 may extend in a first direction, the second inductive capacitance portion 221 may extend in a second direction, and the first direction and the second direction may be at a predetermined angle. There may be at least two first inductive capacitance portions 211 and at least two second inductive capacitance portions 221, and one first inductive capacitance portion 211 and the at least two second inductive capacitance portions 221 may respectively form an inductive capacitance.

Figure 6:
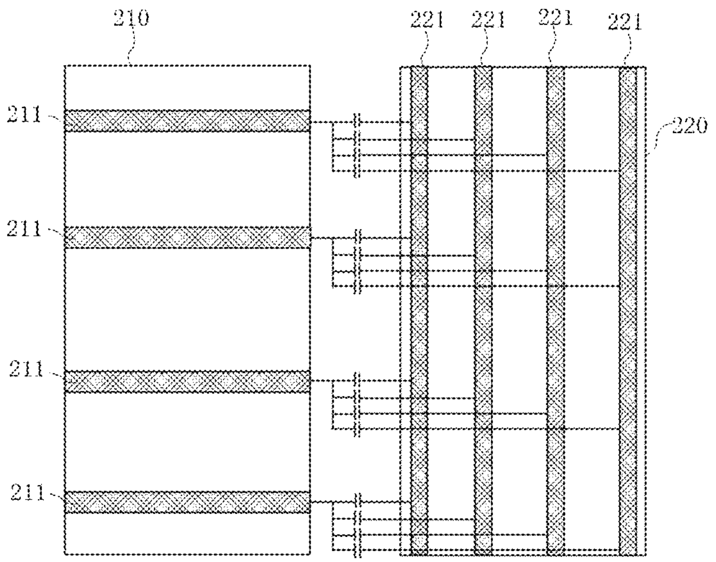
FIG. 6 is a schematic diagram of a battery safety testing apparatus according to an implementation of the present disclosure.
Figure 7:
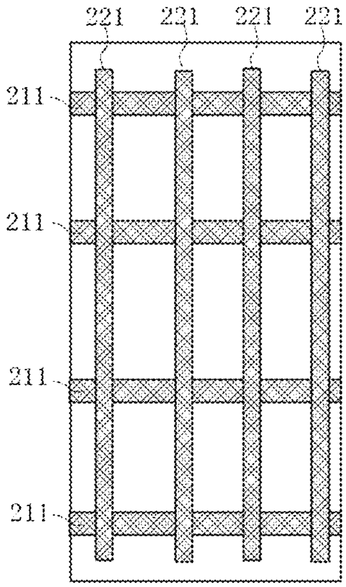
FIG. 7 is a schematic diagram of a battery safety testing apparatus according to an implementation of the present disclosure.

As shown in FIG. 6 and FIG. 7, four first inductive capacitance portions 211 and four second inductive capacitance portions 221 are respectively shown, and the first inductive capacitance portion 211 and the second inductive capacitance portion 221 extend in the first direction and the second direction that are perpendicular to each other. It should be noted that although the predetermined angle between the first direction and the second direction is 90 degrees in FIG. 6 and FIG. 7, the present disclosure is not limited to this angle.

There are at least two first inductive capacitance portions 211 and at least two second inductive capacitance portions 221, and one first inductive capacitance portions 211 and the at least two second inductive capacitance portions 221 respectively form an inductive capacitance. For example, as shown in FIG. 4, one first inductive capacitance portion 211 and a plurality of second inductive capacitance portions 221 may form an inductive capacitance.

Figure 8:
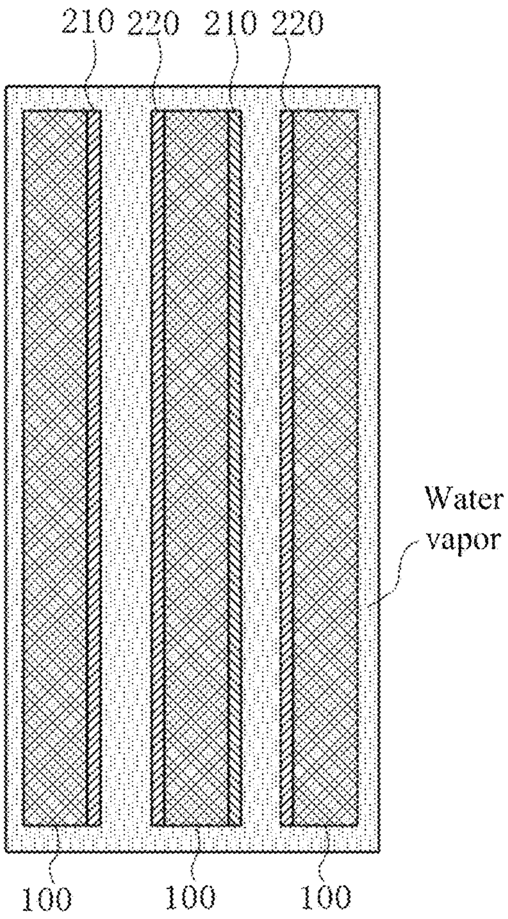
FIG. 8 is a schematic diagram of a battery safety testing apparatus according to an implementation of the present disclosure.

According to a further embodiment of the present disclosure, as shown in FIG. 8, the first capacitive sensing apparatus 210 includes at least two first inductive capacitance portions 211, the second capacitive sensing apparatus 220 includes at least two second inductive capacitance portions 221, and when a change rate or a change value of each inductive capacitance is inconsistent, it is considered that a change of the inductive capacitance is caused by the shape change, or when a change rate or a change value of each inductive capacitance is consistent, it is considered that a change of the inductive capacitance is caused by the change of the water content.

In the implementations or embodiments of the present disclosure, when the water content around the battery changes, a dielectric constant between inductive capacitance portions changes due to the change of the water content, and accordingly, an inductive capacitance value between the inductive capacitance portions changes. In this way, the change of the water content can be effectively measured by using the capacitive sensing apparatus in the present disclosure. When the water content is too high, alarm processing may be performed. In addition, when the water content changes, the dielectric constant caused by the change of the water content around the battery changes uniformly, that is, the change of the dielectric constant caused by the water content around the battery is usually consistent with a variation around the entire battery (for example, inside the battery container).

Figure 9:
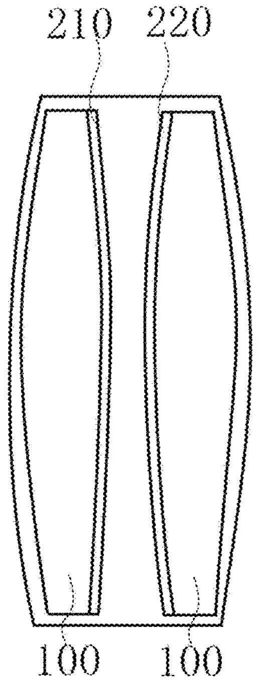
FIG. 9 is a schematic diagram of a battery safety testing apparatus according to an implementation of the present disclosure.

As shown in FIG. 9, when the shape of the battery changes, an inductive capacitance also changes. Because the shape change of the battery is irregular, when a plurality of inductive capacitance portions are used to respectively measure a change of an inductive capacitance of each inductive capacitance portion, the inductive capacitance generated by each inductive capacitance portion varies because locations of the inductive capacitance portions are different and shape changes of the locations are different. The shape change of the battery can be measured by measuring the change rate or the change value of each inductive capacitance. When the change rate or the change value of each inductive capacitance is inconsistent, it is considered that the change of the inductive capacitance is caused by the shape change of the battery.

In the present disclosure, when the shape change of the battery is measured, a deformation location, a deformation degree, a deformation range, and/or a deformation type of the battery can be measured.

For example, if at least two capacitive sensing units are included, the deformation location, the deformation degree, the deformation range, and/or the deformation type of the battery may be obtained by using the capacitive sensing units disposed at different locations and a change difference of inductive capacitances of these capacitive sensing units.

According to a further embodiment, the capacitive sensing apparatus 200 may further include intermediate capacitive sensing apparatus 230, the intermediate capacitive sensing apparatus 230 may be disposed between the first capacitive sensing apparatus 210 and the second capacitive sensing apparatus 220, and the shape change of the battery and/or the water content are/is measured based on an inductive capacitance generated by the intermediate capacitive sensing apparatus 230 and the first capacitive sensing apparatus 210 and/or an inductive capacitance generated by the intermediate capacitive sensing apparatus 230 and the second capacitive sensing apparatus 220.

As shown in FIG. 9, the intermediate capacitive sensing apparatus 230 may be disposed between the first capacitive sensing apparatus 210 and the second capacitive sensing apparatus 220. The first capacitive sensing apparatus 210 may be a first capacitor plate, the second capacitive sensing apparatus 220 is a second capacitor plate, the intermediate capacitive sensing apparatus 230 may be a conductor, a semiconductor, or a conductive material, and a surface of the conductor, the semiconductor, and/or the conductive material is coated with an insulating material.

Although the first capacitive sensing apparatus 210, the second capacitive sensing apparatus 220, and the intermediate capacitive sensing apparatus 230 are in a form of a capacitor plate in FIG. 9, the first capacitive sensing apparatus 210, the second capacitive sensing apparatus 220, and the intermediate capacitive sensing apparatus 230 may be another form as described above. For example, the first capacitive sensing apparatus 210 includes at least two first inductive capacitance portions, the second capacitive sensing apparatus 220 includes at least two second inductive capacitance portions, the intermediate capacitive sensing apparatus 230 includes at least two intermediate inductive capacitance portions, the at least two first inductive capacitance portions are disposed in a one-to-one correspondence with the at least two intermediate inductive capacitance portions, and the at least two second inductive capacitance portions are disposed in a one-to-one correspondence with the at least two intermediate inductive capacitance portions. A shape of the first inductive capacitance portion, the second inductive capacitance portion, and/or the intermediate inductive capacitance portion is selected from a circle, an ellipse, a triangle, and a polygon, the at least two first inductive capacitance portions are located at different locations, the at least two second inductive capacitance portions are located at different locations, and the at least two intermediate inductive capacitance portions are located at different locations. The first capacitive sensing apparatus includes at least one first inductive capacitance portion, the intermediate capacitive sensing apparatus includes at least one intermediate inductive capacitance portion, and a quantity of first inductive capacitance portions is different from a quantity of intermediate inductive capacitance portions, so that at least two first inductive capacitance portions correspond to one intermediate inductive capacitance portion or at least two intermediate inductive capacitance portions correspond to one first inductive capacitance portion. The second capacitive sensing apparatus includes at least one second inductive capacitance portion, the intermediate capacitive sensing apparatus includes at least one intermediate inductive capacitance portion, and a quantity of second inductive capacitance portions is different from a quantity of intermediate inductive capacitance portions, so that at least two second inductive capacitance portions correspond to one intermediate inductive capacitance portion or at least two intermediate inductive capacitance portions correspond to one second inductive capacitance portion. The first inductive capacitance portion and the intermediate inductive capacitance portion are strip-shaped, the first inductive capacitance portion extends in a first direction, the intermediate inductive capacitance portion extends in a second direction, and the first direction and the second direction are at a predetermined angle. The second inductive capacitance portion and the intermediate inductive capacitance portion are strip-shaped, the second inductive capacitance portion extends in a first direction, the intermediate inductive capacitance portion extends in a second direction, and the first direction and the second direction are at a predetermined angle.

A first intermediate inductive capacitance portion corresponding to the first capacitive sensing apparatus and a second intermediate inductive capacitance portion corresponding to the second capacitive sensing apparatus are disposed in the intermediate capacitive sensing apparatus, and an insulating material is disposed between the first intermediate inductive capacitance portion and the second intermediate inductive capacitance portion. The insulating material may make the first intermediate inductive capacitance portion and the second intermediate inductive capacitance portion on both sides of the intermediate capacitive sensing apparatus not affected by each other.

In the foregoing embodiments, the first capacitive sensing apparatus and the second capacitive sensing apparatus in opposite directions are disposed to measure an inductive capacitance generated by the two. However, according to a further embodiment of the present disclosure, the shape change of the battery and/or the water content of the environment in which the battery is located may be measured by using a plurality of inductive capacitance portions disposed on one capacitive sensing apparatus.

Figure 10:
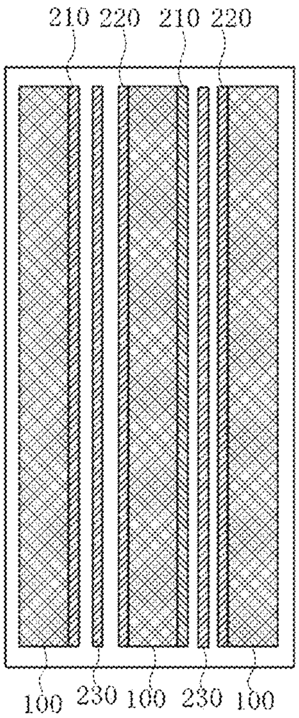
FIG. 10 is a schematic diagram of a battery safety testing apparatus according to an implementation of the present disclosure.
Figure 11:
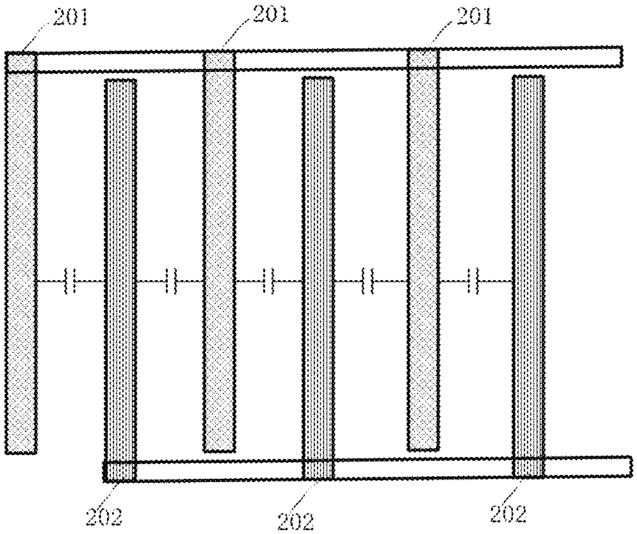
FIG. 11 is a schematic diagram of a battery safety testing apparatus according to an implementation of the present disclosure.

FIG. 10 provides an embodiment in which a plurality of inductive capacitance portions are disposed on one capacitive sensing apparatus. The capacitive sensing apparatus may include a capacitive disposing portion and at least two inductive capacitance portions, the at least two inductive capacitance portions are disposed in the capacitive disposing portion, and the shape change and/or the water content are/is measured based on an inductive capacitance formed between adjacent inductive capacitance portions in the at least two inductive capacitance portions. For example, the shape change and/or the water content are/is measured based on an inductive capacitance between one inductive capacitance portion 201 and an adjacent inductive capacitance portion 202.

In the present disclosure, in the first capacitive sensing apparatus, the second capacitive sensing apparatus, and/or the intermediate capacitive sensing apparatus, one or two capacitive sensing apparatuses may be disposed as an excitation electrode, and another capacitive sensing apparatus may be disposed as a receive electrode. Excitation is provided for the excitation electrode, a measurement value of an inductive capacitance is received from the receive electrode. Inductive capacitance portions of the first capacitive sensing apparatus, the second capacitive sensing apparatus, and/or the intermediate capacitive sensing apparatus may be disposed in parallel.

According to another implementation of the present disclosure, a battery safety testing apparatus is further provided.

Figure 12:
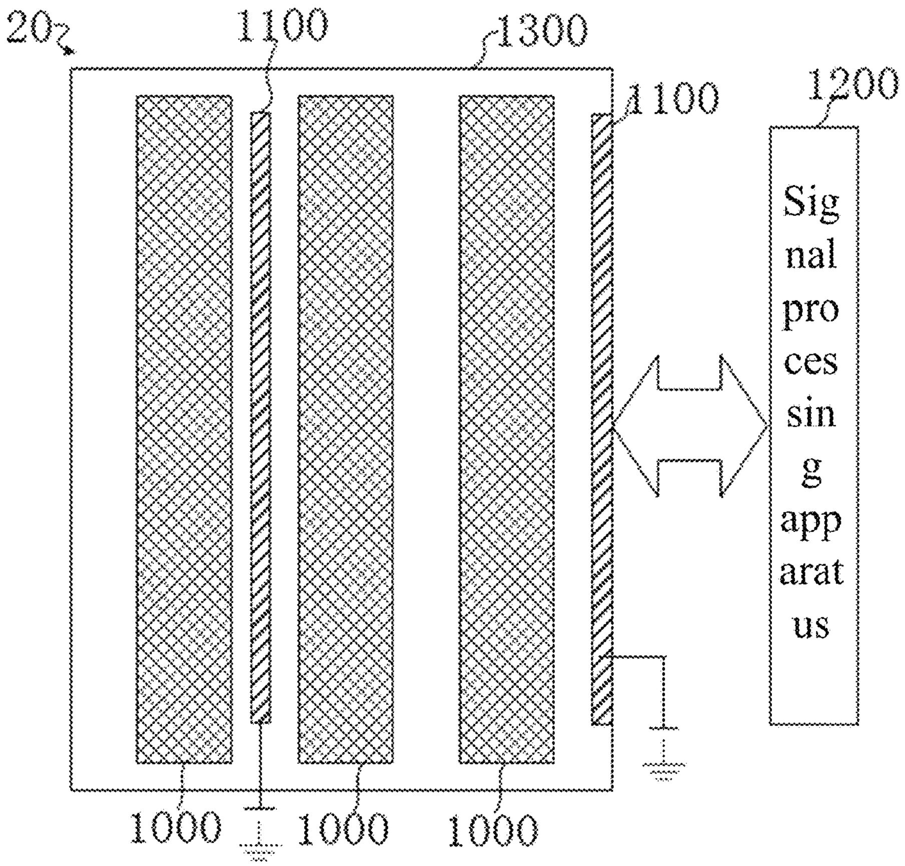
FIG. 12 is a schematic diagram of a battery safety testing apparatus according to an implementation of the present disclosure.

FIG. 12 is a schematic diagram of a battery safety testing apparatus according to an embodiment of the present disclosure. Battery safety testing apparatus 20 is configured to measure a shape change of battery 1000 and/or water content of an environment in which the battery 1000 is located. As shown in FIG. 12, the battery safety testing apparatus 20 may include capacitive sensing apparatus 1100 and signal processing apparatus 1200.

The battery 1000 may be a single battery, or may be a plurality of batteries accommodated in a battery pack.

The capacitive sensing apparatus 1100 may be disposed on or close to a surface of the battery 1000, and may be disposed on or close to an inner surface or an outer surface of the battery 1000 or at a predetermined distance from the outer surface of the battery 1000. When a shape of the battery 1000 changes or the water content changes, an inductive capacitance measured by the capacitive sensing apparatus 1100 changes. The capacitive sensing apparatus 1100 may include one or more inductive capacitance portions, and disposing manners of the inductive capacitance portions are described with reference to specific embodiments.

The signal processing apparatus 1200 may be electrically connected to the capacitive sensing apparatus 1100, and may receive the inductive capacitance from the capacitive sensing apparatus 1100, so that the shape change of the battery 1000 or the water content can be measured based on the received inductive capacitance.

The capacitive sensing apparatus 1100 may be a capacitor plate, and the inductive capacitance portion is formed by using the capacitor plate. The capacitive sensing apparatus 1100 is a conductor or a semiconductor used for packaging the battery and/or a conductor, a semiconductor, and/or a conductive material disposed on or close to an inner surface or an outer surface of the battery 1000, and a surface of the conductor, the semiconductor, and/or the conductive material is coated with an insulating material.

The capacitive sensing apparatus 1100 may include one or more inductive capacitance portions, and the shape change of the battery and/or the water content are/is measured by measuring an inductive capacitance generated by the one or more inductive capacitance portions relative to a reference ground.

For example, FIG. 12 shows a case in which each capacitive sensing apparatus 1100 includes one inductive capacitance portion. The capacitive sensing apparatus 1100 may be disposed in a space between two adjacent batteries, may be disposed in a wall of battery container 1300, or may be disposed outside the battery container 1300.

The capacitive sensing apparatus 1100 includes at least two inductive capacitance portions, the at least two inductive capacitance portions are disposed at an interval of a predetermined distance, and the signal processing apparatus 1200 measures the shape change of the battery and/or the water content of the environment in which the battery is located by detecting an inductive capacitance between each inductive capacitance portion and the reference ground. The reference ground may be a ground of a battery container, a ground of a battery pack, a reference ground of a processing circuit, or a ground of a chip described below.

Figure 13:
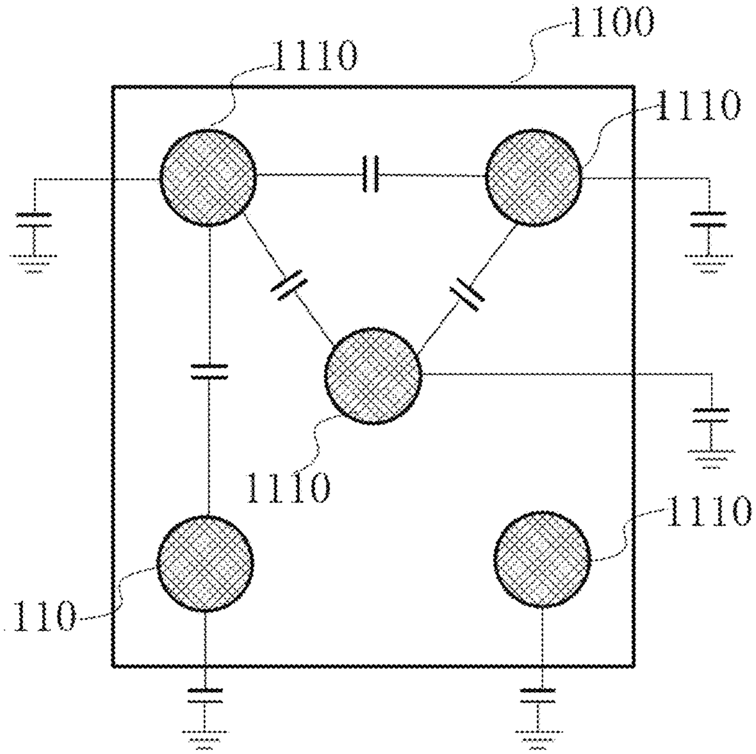
FIG. 13 is a schematic diagram of a battery safety testing apparatus according to an implementation of the present disclosure.

As shown in FIG. 13, the capacitive sensing apparatus 1100 includes at least two inductive capacitance portions 1110, and the inductive capacitance portions 1110 are arranged at an interval of at a predetermined distance. A shape of the inductive capacitance portion 1110 may be a square, a rectangular, a circle, a trapezoid, a diamond, a triangle, T-shaped, fork-shaped, a polygon, or the like, and this is not limited in the present disclosure. When each inductive capacitance portion is excited, an inductive capacitance is formed between the inductive capacitance portion and the reference ground, and the shape change of the battery and/or the water content of the environment in which the battery is located are/is measured by measuring the inductive capacitance.

Figure 14:
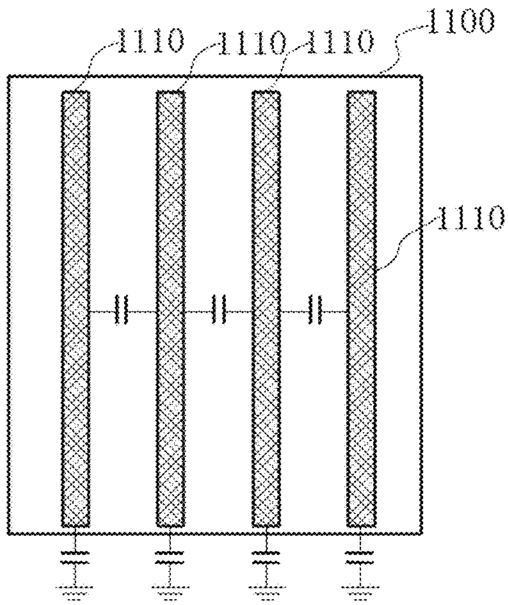
FIG. 14 is a schematic diagram of a battery safety testing apparatus according to an implementation of the present disclosure.

As shown in FIG. 14, the at least two inductive capacitance portions 1110 are strip-shaped and disposed in a first direction. After each inductive capacitance portion is excited, an inductive capacitance is formed between the inductive capacitance portion and the reference ground, and the shape change of the battery and/or the water content of the environment in which the battery is located are/is measured by measuring the inductive capacitance.

In addition, as shown in FIG. 13 and FIG. 14, an inductive capacitance between an inductive capacitance portion and the reference ground may be used for detection, and an inductive capacitance between inductive capacitance portions may also be used for detection.

Similarly, there are at least two inductive capacitance portions, and when a change rate or a change value of an inductive capacitance measured by each inductive capacitance portion is inconsistent, it is considered that a change of the inductive capacitance is caused by the shape change; or when a change rate or a change value of an inductive capacitance measured by each inductive capacitance portion is consistent, it is considered that a change of the inductive capacitance is caused by the change of the water content. The shape change includes a deformation location, a deformation degree, a deformation range, and/or a deformation type, and the shape change is obtained based on the change rate or the change value of the inductive capacitance measured by each inductive capacitance portion.

In the foregoing implementations, the change value or the change rate of the inductive capacitance may be used as a determining criterion. For example, when each inductive capacitance unit has a same size and a same shape, if the water content changes, a change of a capacitance value detected by each inductive capacitance unit is the same (because a change of a dielectric constant caused by the water content in the battery pack is uniform). However, when each inductive capacitance unit has a different size and/or a different shape, if the water content in the battery pack changes, a change of a capacitance value detected by each inductive capacitance unit may be different. In this case, a change caused by the water content may be obtained by calculating a change rate of the capacitance value of each inductive capacitance unit, for example, a change rate of a capacitance value between adjacent moments. The same principle is also used for measurement of the shape change, and details are not described herein again.

In addition, in the foregoing implementations, an aluminum foil used for packaging the battery may be used as the capacitive sensing apparatus, and an insulating layer may be disposed between the aluminum foil and the battery body. In addition, an insulating layer, such as PET, may be coated on an outer side of the inductive capacitance portion to avoid a short circuit.

Figure 15:
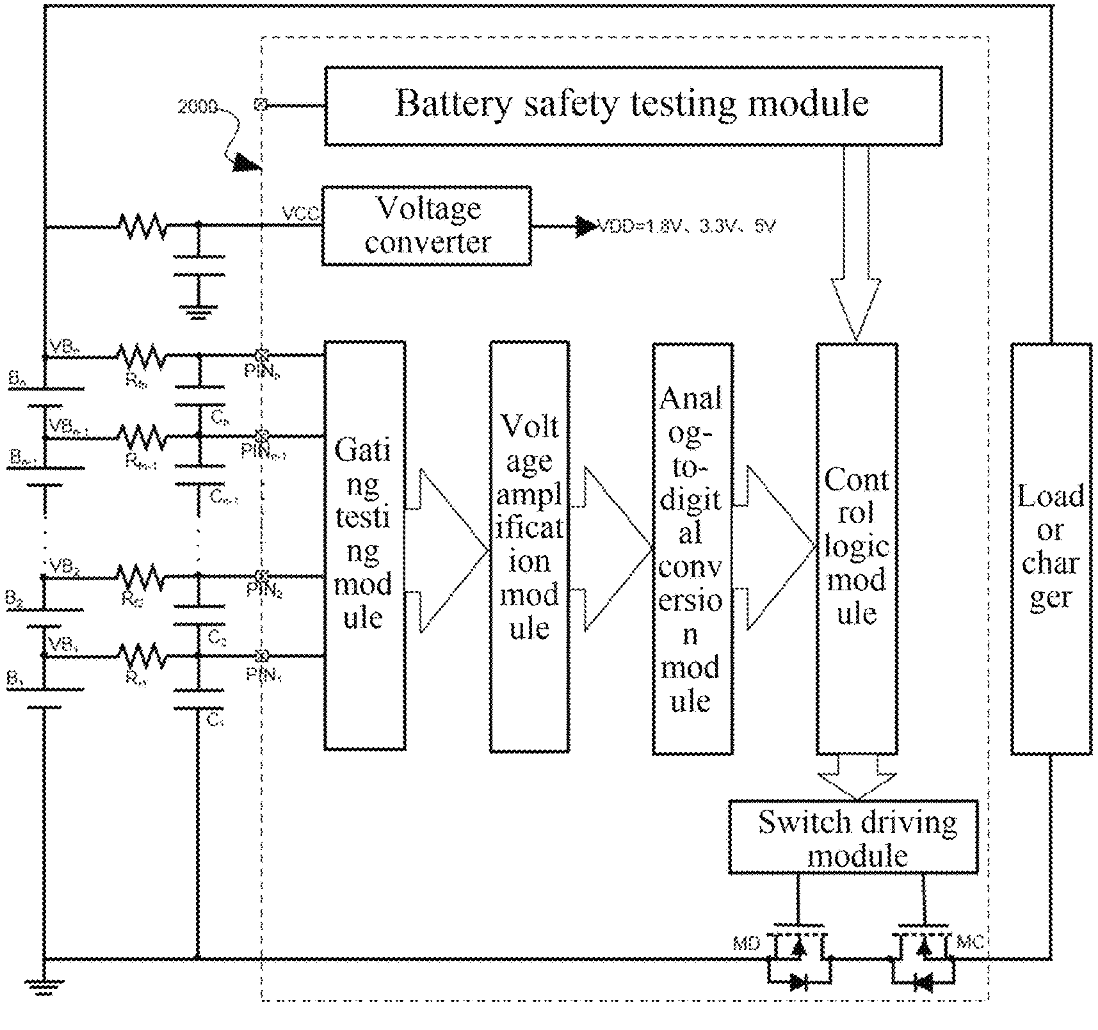
FIG. 15 is a schematic diagram of a battery management chip according to an implementation of the present disclosure.

According to a further implementation of the present disclosure, as shown in FIG. 15, a battery management chip (shown in dashed lines) is further provided, and the battery management chip is integrated with the foregoing signal processing apparatus (a battery safety testing module shown in FIG. 15). The chip may further be integrated with a gating testing module, a voltage amplification module, an analog-to-digital conversion module, a control logic module, a switch driving module, and a voltage converter. The gating testing module is configured to select to sample a voltage of each battery, the voltage amplification module is configured to amplify the collected voltage, the analog-to-digital conversion module is configured to convert the collected voltage from an analog signal to a digital signal, the control logic module is configured to receive the digital signal, to provide a control signal for the switch driving module, and the switch driving module is configured to control a discharge switch MD and a charging switch MC to be turned on and turned off.

Figure 16:
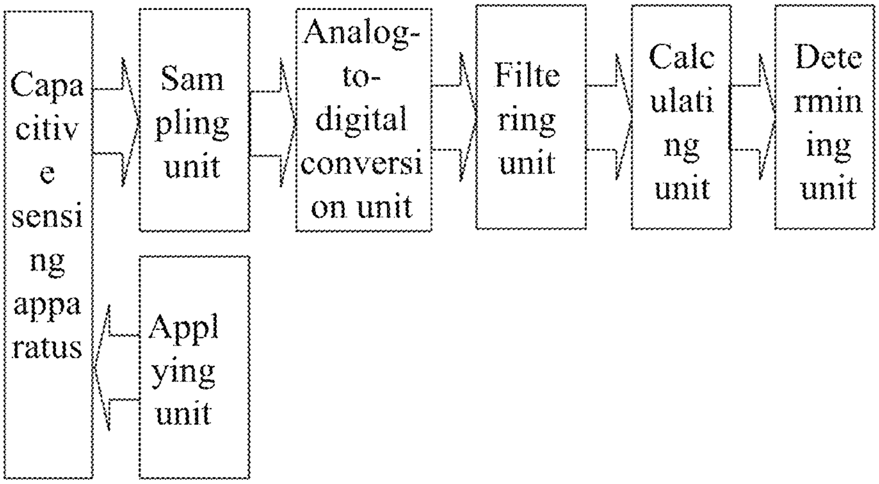
FIG. 16 is a schematic diagram of a signal processing apparatus according to an implementation of the present disclosure.

As shown in FIG. 16, the signal processing apparatus includes: a sampling unit, configured to collect an inductive capacitance generated by a capacitive sensing apparatus; an analog-to-digital conversion unit, configured to convert the collected inductive capacitance into a digital signal; a filtering unit, configured to perform filtering processing on the digital signal to obtain a filtered signal; a calculating unit, configured to calculate the filtered signal to obtain a change rate or a change value of the inductive capacitance; and a determining unit, configured to: determine a fault of the battery based on the change rate or the change value of the inductive capacitance, or when a change of the inductive capacitance exceeds a predetermined threshold, determine a problem of excessive water content or excessive deformation of the battery. The signal processing apparatus further includes a multiplexing unit, so that if the capacitive sensing apparatus includes at least two inductive capacitance portions, the multiplexing unit selects and measures an inductive capacitance of each inductive capacitance portion, and provides the measured inductive capacitance for the sampling unit. The battery management chip further includes an applying unit, and the applying unit is configured to provide an excitation signal for the capacitive sensing apparatus. An applying unit may be configured to apply excitation to one or more inductive capacitance portions in the at least two inductive capacitance portions through time division.

For example, an excitation voltage is applied to one inductive capacitance unit at a first time, and an inductive voltage obtained based on the excitation is measured; and then an excitation voltage is applied to another inductive capacitance unit, and an inductive voltage obtained based on the excitation is measured, . . . , and finally, an inductive capacitance value may be obtained after an excitation voltage is applied to each inductive capacitance unit.

Figure 17:
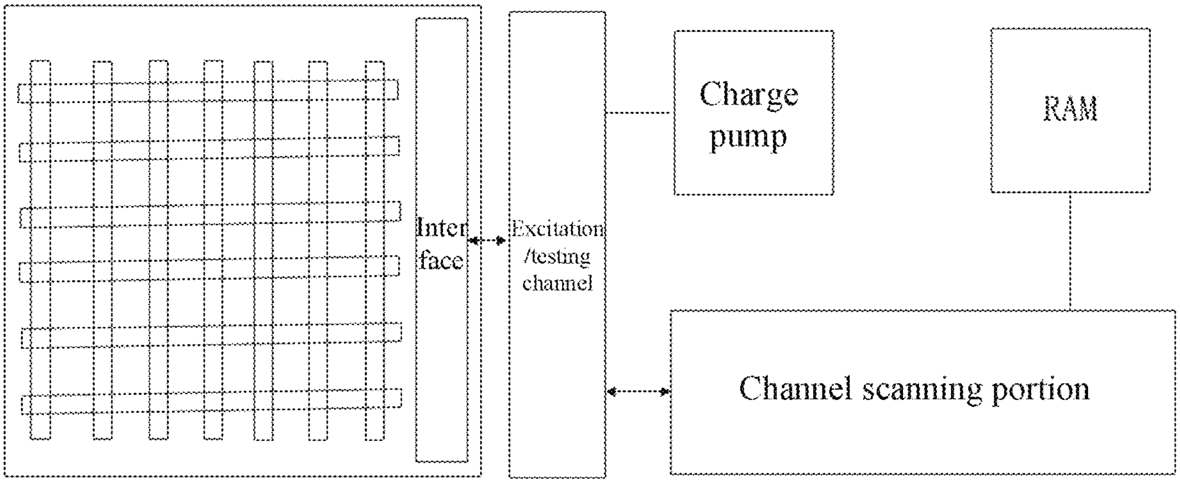
FIG. 17 is a schematic diagram of an excitation testing apparatus according to an implementation of the present disclosure.
Figure 18:
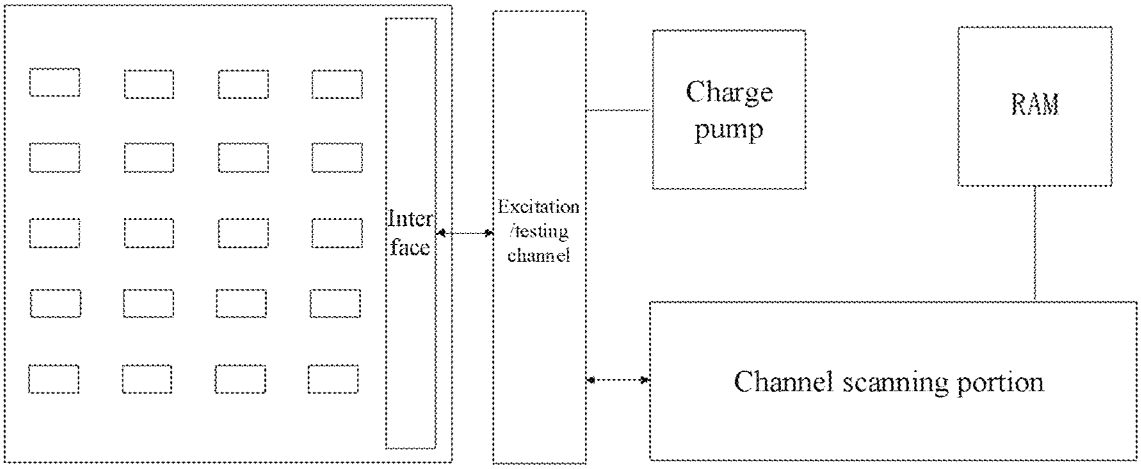
FIG. 18 is a schematic diagram of an excitation testing apparatus according to an implementation of the present disclosure.

FIG. 17 and FIG. 18 are schematic diagrams in of an excitation measurement apparatus for a plurality of inductive capacitance units. The excitation measurement apparatus includes one or more excitation/testing channels and a channel scanning portion. The channel scanning portion may access an RAM and read data from the excitation/testing channel, and may provide a control signal for the excitation/testing channel, to generate excitation signals at various frequencies and phases. These excitation signals may be selectively applied to the inductive capacitance unit. A charge pump may be configured to provide an excitation signal.

In a configuration of the inductive capacitance unit shown in FIG. 17, a row electrode and a column electrode are coupled to the excitation/testing channel through an interface, and an intersection point of the row electrode and the column electrode may be used as a measurement node. For example, the row electrode may be coupled to an excitation channel in the excitation/testing channel, and the column electrode may be coupled to a testing channel in the excitation/testing channel.

In a configuration of the inductive capacitance unit shown in FIG. 18, a first inductive capacitance portion in the inductive capacitance unit may be coupled to an excitation channel in the excitation/testing channel, and a second inductive capacitance portion may be coupled to a testing channel in the excitation/testing channel.

According to an implementation of the present disclosure, a battery management system (as shown in FIG. 1) is further provided, including the foregoing battery safety testing apparatus and configured to measure, by using the battery safety testing apparatus, the shape change of the battery and/or the water content of the environment in which the battery is located.

In the description of this specification, the description of the terms “one embodiment/implementation”, “some embodiments/implementations”, “example”, “specific example”, or “some examples” means that the specific features, structures, materials, or characteristics described with reference to the embodiment/implementation or example are included in at least one embodiment/implementation or example of the present disclosure. In this specification, the illustrative expressions of the above terms are not intended to refer to the same embodiment/implementation or example. Moreover, the specific features, structures, materials, or characteristics described may be combined in any suitable manner in any one or more embodiments/implementations or examples. In addition, those skilled in the art may combine different embodiments/implementations or examples described herein or features in different embodiments/implementations or examples without any contradiction.

In addition, the terms “first” and “second” are merely intended for a purpose of description, and shall not be understood as an indication or implication of relative importance or implicit indication of a quantity of indicated technical features. Therefore, a feature limited by "first" or "second" may explicitly or implicitly include at least one such feature. In the description of the present disclosure, "a plurality of" means at least two, such as two or three, unless otherwise clearly and specifically limited.

Those skilled in the art should understand that the foregoing implementations are merely intended to describe the present disclosure clearly, rather than to limit the scope of the present disclosure. Those skilled in the art may make other changes or modifications based on the present disclosure, but these changes or modifications should fall within the scope of the present disclosure.

What is claimed is:

1. A battery safety testing apparatus, wherein the battery safety testing apparatus is configured to measure a shape change of a battery, and the battery safety testing apparatus comprises:

a capacitive sensing apparatus, wherein the capacitive sensing apparatus comprises at least one inductive capacitance portions, the capacitive sensing apparatus is disposed on or close to a surface of the battery, and when the shape change occurs, an inductive capacitance measured by the at least one inductive capacitance portion changes; and a signal processing apparatus, wherein the signal processing apparatus is connected to the capacitive sensing apparatus and configured to receive the inductive capacitance measured by the at least one inductive capacitance portion, the signal processing apparatus is further configured to measure, based on the inductive capacitance, the shape change of the battery, wherein the at least one capacitive sensing apparatus comprises a first capacitive sensing apparatus and a second capacitive sensing apparatus, the battery comprises at least two battery cells, adjacent two of the at least two battery cells are arranged at an interval of a predetermined space, the first capacitive sensing apparatus is disposed in one of the adjacent two of the at least two battery cells, and the second capacitive sensing apparatus is disposed in the other of the adjacent two of the at least two battery cells; or the at least one capacitive sensing apparatus comprises a first capacitive sensing apparatus and a second capacitive sensing apparatus, the first capacitive sensing apparatus is disposed on or close to the surface of the battery, and the second capacitive sensing apparatus is disposed close to the first capacitive sensing apparatus.

2. The battery safety testing apparatus according to claim 1, wherein each of the at least one capacitive sensing apparatus is a capacitor plate, the capacitor plate forms the at least one inductive capacitance portion, and each of the at least one capacitive sensing apparatus is a conductor.

3. The battery safety testing apparatus according to claim 1, wherein the first capacitive sensing apparatus comprises at least one first inductive capacitance portions, the second capacitive sensing apparatus comprises at least one second inductive capacitance portions, and the at least one first inductive capacitance portion and/or the at least one second inductive capacitance portion are configured to detect a change of the inductive capacitance caused by the shape change; or the first capacitive sensing apparatus is a first capacitor plate, and the second capacitive sensing apparatus is a second capacitor plate; or the first capacitive sensing apparatus comprises at least two first inductive capacitance portions, the second capacitive sensing apparatus comprises at least two second inductive capacitance portions, the at least two first inductive capacitance portions are disposed in a one-to-one correspondence with the at least two second inductive capacitance portions, a shape of the at least two first inductive capacitance portions and/or the at least two second inductive capacitance portions is selected from a circle, an ellipse, a triangle, and a polygon, the at least two first inductive capacitance portions are located at different locations, and the at least two second inductive capacitance portions are located at different locations; or the first capacitive sensing apparatus comprises at least one first inductive capacitance portion, the second capacitive sensing apparatus comprises at least one second inductive capacitance portion, and a quantity of first inductive capacitance portions is different from a quantity of second inductive capacitance portions, so that at least two first inductive capacitance portions correspond to one second inductive capacitance portion or at least two second inductive capacitance portions correspond to one first inductive capacitance portion; or the first capacitive sensing apparatus comprises at least two first inductive capacitance portions, the second capacitive sensing apparatus comprises at least two second inductive capacitance portions, wherein the at least two first inductive capacitance portion and the at least two second inductive capacitance portion are strip-shaped, the at least one first inductive capacitance portion extends in a first direction, the at least one second inductive capacitance portion extends in a second direction, the first direction and the second direction are at a predetermined angle, and one first inductive capacitance portion and the at least two second inductive capacitance portions respectively form an inductive capacitance; or the first capacitive sensing apparatus comprises at least two first inductive capacitance portions, the second capacitive sensing apparatus comprises at least two second inductive capacitance portions, and when a change rate or a change value of each inductive capacitance is inconsistent, it is determined that a change of the inductive capacitance is caused by the shape change; when the change rate or the change value of each inductive capacitance is consistent, it is determined that the change of the inductive capacitance is caused by change of water content, wherein the shape change comprises a deformation location, a deformation degree, a deformation range, and/or a deformation type, and the shape change is obtained based on the change rate or the change value of the inductive capacitance measured by each capacitive sensing apparatus.

4. The battery safety testing apparatus according to claim 3, wherein the capacitive sensing apparatus further comprises an intermediate capacitive sensing apparatus, the intermediate capacitive sensing apparatus is disposed between the first capacitive sensing apparatus and the second capacitive sensing apparatus, and the shape change of the battery is measured based on an inductive capacitance generated by the intermediate capacitive sensing apparatus and the first capacitive sensing apparatus and/or an inductive capacitance generated by the intermediate capacitive sensing apparatus and the second capacitive sensing apparatus; or the first capacitive sensing apparatus is a first capacitor plate, the second capacitive sensing apparatus is a second capacitor plate, the intermediate capacitive sensing apparatus is a conductor; or the first capacitive sensing apparatus comprises at least two first inductive capacitance portions, the second capacitive sensing apparatus comprises at least two second inductive capacitance portions, the intermediate capacitive sensing apparatus comprises at least two intermediate inductive capacitance portions, the at least two first inductive capacitance portions are disposed in a one-to-one correspondence with the at least two intermediate inductive capacitance portions, the at least two second inductive capacitance portions are disposed in a one-to-one correspondence with the at least two intermediate inductive capacitance portions, a shape of the at least two first inductive capacitance portions, the at least two second inductive capacitance portions, and/or the at least two intermediate inductive capacitance portions is selected from a circle, an ellipse, a triangle, and a polygon, the at least two first inductive capacitance portions are located at different locations, the at least two second inductive capacitance portions are located at different locations, and the at least two intermediate inductive capacitance portions are located at different locations; or the first capacitive sensing apparatus comprises at least one first inductive capacitance portion, the intermediate capacitive sensing apparatus comprises at least one intermediate inductive capacitance portion, and a quantity of first inductive capacitance portions is different from a quantity of intermediate inductive capacitance portions, so that at least two first inductive capacitance portions correspond to one intermediate inductive capacitance portion or at least two intermediate inductive capacitance portions correspond to one first inductive capacitance portion; or the second capacitive sensing apparatus comprises at least one second inductive capacitance portion, the intermediate capacitive sensing apparatus comprises at least one intermediate inductive capacitance portion, and a quantity of second inductive capacitance portions is different from a quantity of intermediate inductive capacitance portions, so that at least two second inductive capacitance portions correspond to one intermediate inductive capacitance portion or at least two intermediate inductive capacitance portions correspond to one second inductive capacitance portion; or the first capacitive sensing apparatus comprises at least one first inductive capacitance portion, the intermediate capacitive sensing apparatus comprises at least one intermediate inductive capacitance portion, wherein the at least one first inductive capacitance portion and the at least one intermediate inductive capacitance portion are strip-shaped, the at least one first inductive capacitance portion extends in a first direction, the at least one intermediate inductive capacitance portion extends in a second direction, and the first direction and the second direction are at a predetermined angle; or the second capacitive sensing apparatus comprises at least one second inductive capacitance portion, the intermediate capacitive sensing apparatus comprises at least one intermediate inductive capacitance portion, wherein the at least one second inductive capacitance portion and the at least one intermediate inductive capacitance portion are strip-shaped, the at least one second inductive capacitance portion extends in a first direction, the at least one intermediate inductive capacitance portion extends in a second direction, and the first direction and the second direction are at a predetermined angle; or the intermediate capacitive sensing apparatus is provided with a first intermediate inductive capacitance portion corresponding to the first capacitive sensing apparatus and a second intermediate inductive capacitance portion corresponding to the second capacitive sensing apparatus, and a third insulating material is disposed between the first intermediate inductive capacitance portion and the second intermediate inductive capacitance portion.

5. The battery safety testing apparatus according to claim 1, wherein each of the capacitive sensing apparatuses comprises a capacitive disposing portion and at least two inductive capacitance portions, the at least two inductive capacitance portions are disposed in the capacitive disposing portion, and the shape change is measured based on an inductive capacitance formed between adjacent inductive capacitance portions in the at least two inductive capacitance portions.

6. A battery safety testing apparatus, wherein the battery safety testing apparatus is configured to measure a shape change of a battery, and the battery safety testing apparatus comprises:

a capacitive sensing apparatus, wherein the capacitive sensing apparatus comprises at least one inductive capacitance portions, the capacitive sensing apparatus is disposed on or close to a surface of the battery, and when the shape change occurs, an inductive capacitance measured by the at least one inductive capacitance portion changes; and a signal processing apparatus, wherein the signal processing apparatus is connected to the capacitive sensing apparatus and configured to receive the inductive capacitance measured by the at least one inductive capacitance portion, the signal processing apparatus is further configured to measure, based on the inductive capacitance, the shape change of the battery, wherein the shape change is measured by measuring an inductive capacitance generated by the at least one inductive capacitance portions relative to a reference ground, the battery is stored in a battery container, the capacitive sensing apparatus is disposed on the battery container or inside or outside the battery container, the capacitive sensing apparatus comprises at least two inductive capacitance portions, the at least two inductive capacitance portions are disposed at an interval of a predetermined distance, the signal processing apparatus measures the shape change by detecting an inductive capacitance between each inductive capacitance portion and the reference ground, and the signal processing apparatus further measures the shape change by detecting an inductive capacitance between each of the at least two inductive capacitance portions and an adjacent inductive capacitance portion, wherein the at least two inductive capacitance portions are strip-shaped and disposed in a first direction, or shapes of the at least two inductive capacitance portions are selected from a circle, an ellipse, a triangle, and a polygon, and the at least two inductive capacitance portions are located at different locations.

7. The battery safety testing apparatus according to claim 6, wherein when a change rate or a change value of an inductive capacitance measured by each inductive capacitance portion is inconsistent, it is determined that a change of the inductive capacitance is caused by the shape change;

when the change rate or the change value of the inductive capacitance measured by each inductive capacitance portion is consistent, it is determined that the change of the inductive capacitance is caused by a change of water content, wherein the shape change comprises a deformation location, a deformation degree, a deformation range, and/or a deformation type, and the shape change is obtained based on the change rate or the change value of the inductive capacitance measured by each inductive capacitance portion.

8. A battery management system, comprising the battery safety testing apparatus according to claim 1 and configured to measure a shape change by using the battery safety testing apparatus.

9. The battery management system according to claim 8, wherein each of the at least one capacitive sensing apparatus is a capacitor plate, the capacitor plate forms the at least one inductive capacitance portion, and each of the at least one capacitive sensing apparatus is a conductor.

10. The battery management system according to claim 8, wherein the first capacitive sensing apparatus comprises at least one first inductive capacitance portions, the second capacitive sensing apparatus comprises at least one second inductive capacitance portions, and the at least one first inductive capacitance portion and/or the at least one second inductive capacitance portion are configured to detect a change of the inductive capacitance caused by the shape change; or the first capacitive sensing apparatus is a first capacitor plate, and the second capacitive sensing apparatus is a second capacitor plate; or the first capacitive sensing apparatus comprises at least two first inductive capacitance portions, the second capacitive sensing apparatus comprises at least two second inductive capacitance portions, the at least two first inductive capacitance portions are disposed in a one-to-one correspondence with the at least two second inductive capacitance portions, a shape of the at least two first inductive capacitance portions and/or the at least two second inductive capacitance portions is selected from a circle, an ellipse, a triangle, and a polygon, the at least two first inductive capacitance portions are located at different locations, and the at least two second inductive capacitance portions are located at different locations; or the first capacitive sensing apparatus comprises at least one first inductive capacitance portion, the second capacitive sensing apparatus comprises at least one second inductive capacitance portion, and a quantity of first inductive capacitance portions is different from a quantity of second inductive capacitance portions, so that at least two first inductive capacitance portions correspond to one second inductive capacitance portion or at least two second inductive capacitance portions correspond to one first inductive capacitance portion; or the first capacitive sensing apparatus comprises at least two first inductive capacitance portions, the second capacitive sensing apparatus comprises at least two second inductive capacitance portions, wherein the at least two first inductive capacitance portion and the at least two second inductive capacitance portion are strip-shaped, the at least one first inductive capacitance portion extends in a first direction, the at least one second inductive capacitance portion extends in a second direction, the first direction and the second direction are at a predetermined angle, and one first inductive capacitance portion and the at least two second inductive capacitance portions respectively form an inductive capacitance; or the first capacitive sensing apparatus comprises at least two first inductive capacitance portions, the second capacitive sensing apparatus comprises at least two second inductive capacitance portions, and when a change rate or a change value of each inductive capacitance is inconsistent, it is determined that a change of the inductive capacitance is caused by the shape change; when the change rate or the change value of each inductive capacitance is consistent, it is determined that the change of the inductive capacitance is caused by a change of water content, wherein the shape change comprises a deformation location, a deformation degree, a deformation range, and/or a deformation type, and the shape change is obtained based on the change rate or the change value of the inductive capacitance measured by each capacitive sensing apparatus.

11. The battery management system according to claim 10, wherein the capacitive sensing apparatus further comprises an intermediate capacitive sensing apparatus, the intermediate capacitive sensing apparatus is disposed between the first capacitive sensing apparatus and the second capacitive sensing apparatus, and the shape change of the battery is measured based on an inductive capacitance generated by the intermediate capacitive sensing apparatus and the first capacitive sensing apparatus and/or an inductive capacitance generated by the intermediate capacitive sensing apparatus and the second capacitive sensing apparatus; or the first capacitive sensing apparatus is a first capacitor plate, the second capacitive sensing apparatus is a second capacitor plate, the intermediate capacitive sensing apparatus is a conductor; or the first capacitive sensing apparatus comprises at least two first inductive capacitance portions, the second capacitive sensing apparatus comprises at least two second inductive capacitance portions, the intermediate capacitive sensing apparatus comprises at least two intermediate inductive capacitance portions, the at least two first inductive capacitance portions are disposed in a one-to-one correspondence with the at least two intermediate inductive capacitance portions, the at least two second inductive capacitance portions are disposed in a one-to-one correspondence with the at least two intermediate inductive capacitance portions, a shape of the at least two first inductive capacitance portions, the at least two second inductive capacitance portions, and/or the at least two intermediate inductive capacitance portions is selected from a circle, an ellipse, a triangle, and a polygon, the at least two first inductive capacitance portions are located at different locations, the at least two second inductive capacitance portions are located at different locations, and the at least two intermediate inductive capacitance portions are located at different locations; or the first capacitive sensing apparatus comprises at least one first inductive capacitance portion, the intermediate capacitive sensing apparatus comprises at least one intermediate inductive capacitance portion, and a quantity of first inductive capacitance portions is different from a quantity of intermediate inductive capacitance portions, so that at least two first inductive capacitance portions correspond to one intermediate inductive capacitance portion or at least two intermediate inductive capacitance portions correspond to one first inductive capacitance portion; or the second capacitive sensing apparatus comprises at least one second inductive capacitance portion, the intermediate capacitive sensing apparatus comprises at least one intermediate inductive capacitance portion, and a quantity of second inductive capacitance portions is different from a quantity of intermediate inductive capacitance portions, so that at least two second inductive capacitance portions correspond to one intermediate inductive capacitance portion or at least two intermediate inductive capacitance portions correspond to one second inductive capacitance portion; or the first capacitive sensing apparatus comprises at least one first inductive capacitance portion, the intermediate capacitive sensing apparatus comprises at least one intermediate inductive capacitance portion, wherein the at least one first inductive capacitance portion and the at least one intermediate inductive capacitance portion are strip-shaped, the at least one first inductive capacitance portion extends in a first direction, the at least one intermediate inductive capacitance portion extends in a second direction, and the first direction and the second direction are at a predetermined angle; or the second capacitive sensing apparatus comprises at least one second inductive capacitance portion, the intermediate capacitive sensing apparatus comprises at least one intermediate inductive capacitance portion, wherein the at least one second inductive capacitance portion and the at least one intermediate inductive capacitance portion are strip-shaped, the at least one second inductive capacitance portion extends in a first direction, the at least one intermediate inductive capacitance portion extends in a second direction, and the first direction and the second direction are at a predetermined angle; or the intermediate capacitive sensing apparatus is provided with a first intermediate inductive capacitance portion corresponding to the first capacitive sensing apparatus and a second intermediate inductive capacitance portion corresponding to the second capacitive sensing apparatus, and a third insulating material is disposed between the first intermediate inductive capacitance portion and the second intermediate inductive capacitance portion.

12. The battery management system according to claim 8, wherein each of the capacitive sensing apparatuses comprises a capacitive disposing portion and at least two inductive capacitance portions, the at least two inductive capacitance portions are disposed in the capacitive disposing portion, and the shape change is measured based on an inductive capacitance formed between adjacent inductive capacitance portions in the at least two inductive capacitance portions.

* * * * *